United States Patent [19]
Hayashi et al.

[11] Patent Number: 5,366,832
[45] Date of Patent: Nov. 22, 1994

[54] SEPARATOR FOR ALKALINE BATTERIES

[75] Inventors: Hideo Hayashi, Yamatotakada; Hiroyuki Kawai, Okayama; Tomoyasu Sonetaka, Okayama; Shingo Nakanishi, Okayama; Junichi Asaoka, Ikoma; Yuji Mototani, Yawata, all of Japan

[73] Assignees: Kuraray Co., Ltd., Okayama; Matsushita Electric Industrial Co., Ltd., Osaka, both of Japan

[21] Appl. No.: 69,512

[22] Filed: Jun. 1, 1993

[30] Foreign Application Priority Data

Jun. 1, 1992 [JP] Japan .................................. 4-166838

[51] Int. Cl.$^5$ ............................................. H01M 2/16
[52] U.S. Cl. ........................................ 429/249; 429/255
[58] Field of Search ..................... 429/250, 255, 249

[56] References Cited

U.S. PATENT DOCUMENTS

| | | | |
|---|---|---|---|
| 2,531,504 | 11/1950 | Dillehay et al. | 429/250 |
| 2,673,887 | 3/1954 | Booth | 429/250 X |
| 4,746,586 | 5/1988 | Mizutani et al. | 429/145 |
| 4,767,687 | 8/1988 | LaBonte | 429/206 |

FOREIGN PATENT DOCUMENTS

| | | |
|---|---|---|
| 503811 | 9/1992 | European Pat. Off. ...... H01M 2/16 |
| 53-11059 | 4/1978 | Japan . |
| 62-154559 | 7/1987 | Japan . |
| 1-146249 | 6/1989 | Japan . |
| 2-119049 | 5/1990 | Japan . |

OTHER PUBLICATIONS

Database WP1, Derwent Publications, AN77-73753Y, JP-B-52037169 (1977) (Month N.A.).
Chemical Abstracts, vol. 86, No. 10, Abstract No. 56658p (1976) (Month N.A.).

*Primary Examiner*—Stephen Kalafut
*Attorney, Agent, or Firm*—Wenderoth, Lind & Ponack

[57] ABSTRACT

A separator for alkaline batteries comprising as at least part of the main fibers a fibrilated product of cellulose fiber obtained by dissolving cellulose in a solvent and depositing cellulose directly. As another main fiber, preferably an extra fine synthetic fiber, particularly preferably a polyvinyl alcohol synthetic fiber is used. The binder is preferably polyvinyl alcohol. Also provided is an alkaline battery wherein such a separator is used. Preferably, the above cellulose fiber is cellulose fiber whose wet Young's modulus is 20 g/d or more and orientation degree Δn is $42 \times 10^{-3}$ or more.

10 Claims, 1 Drawing Sheet

Fig. 1

SEPARATOR FOR ALKALINE BATTERIES

This invention relates to a separator for an alkaline battery using zinc as a negative electrode active substance such as an alkaline manganese battery or a silver oxide battery, and further relates to a separator for an alkaline battery which enhances battery performances such as the lifetime or prevention of internal short circuit of an alkaline battery, wherein mercury is not added to the zinc negative electrode.

PRIOR ART

As performances requested for a separator for alkaline batteries, there can be mentioned alkali resistance, electrolytic solution absorptivity, separability, etc.

Alkali resistance means that the separator is not deteriorated or eluted by an alkali such as an aqueous potassium hydroxide solution used as an electrolytic solution, and the lack of alkali resistance causes problems which have a bad influence on cell reaction and cause internal short circuit between both electrodes of the battery.

Electrolytic solution absorptivity means the separator is sufficiently impregnated with an electrolytic solution necessary for cell reaction, and the lack thereof causes problems that cell reaction is impeded and it becomes impossible to take out a large amount of electric current which are a characteristic of alkaline batteries.

Separability means having fine pores, and the lack thereof causes problems that needle crystals (i.e. dendrite) of conductive zinc oxide formed by cell reaction penetrate the separator and cause internal short circuit.

Various investigations have been made on conventional separators for alkaline manganese batteries so as to satisfy the above performances.

For example, as a separator for enhancing electrolytic solution absorptivity, there is a wet method nonwoven fabric wherein a polyvinyl alcohol fiber and a hydrophilic fiber are combined, as disclosed in Japanese Patent Publication No. 11059/1978, and for example as a separator for enhancing separability, there is one wherein a polyvinyl alcohol fiber of 0.8 denier or less and a cellulose fiber are combined, as disclosed in Japanese Laid-Open Patent Publication No. 154559/1987.

However, recently it is required for the purpose of the protection of the environment to lower the amount of mercury which is added to the negative electrode for the restraint of the self-discharge reaction of zinc, and although the mercury addition amount was 9.0 wt. % based on zinc in or before 1985, it became 1.5 wt. % in 1987, and further it was decided to make the mercury amount zero in 1992.

In proportion to the lowering of the rate of mercury addition, needle crystals of zinc oxide become fine, and therefore internal short circuit in the battery tends to take place easily. Further, the amount of zinc oxide dissolved in the electrolytic solution becomes large, and thereby cell reaction is inhibited, and as a result the lifetime of the battery up to the end voltage tends to lower.

Therefore, before the mercury addition rate of the status quo became 1.5 wt. % based on zinc, various investigations had been made for development of separators having further higher separability and higher electrolytic solution absorptivity.

For example, there is a separator mainly comprising a polyvinyl alcohol fiber of 0.5 denier or less, as disclosed in Japanese Laid-Open Patent Publication No. 146249/1989. However, in this case, although extremely good separability can be attained and internal short circuit does not occur even when the mercury addition rate is 1.5 wt. % based on zinc, electrolytic solution absorptivity lowers because of heightening of the density of the separator, and thus the amount of the electrolytic solution becomes insufficient even when the swelling of the combined cellulose fibers is taken into account.

As a means for solving the problem, a separator obtained by making paper from a mixture of a alkali-resistant cellulose fiber capable of being beaten and a synthetic fiber was investigated, as disclosed in Japanese Laid-Open Patent Publication No. 119049/1990. In this case, the cellulose fiber was beaten and made fine, and thereby the density of the separator was made higher, and the resultant separator had, even when the mercury addition rate was 1.5 wt. % based on zinc, excellent separability, and excellent electrolytic solution absorptivity because of the swelling of the cellulose fiber itself.

However, when a zinc negative electrode wherein no mercury had been added was used, the tendency of the needle crystals of zinc oxide becoming fine becomes further larger compared to the case of the mercury addition rate being 1.5 wt. %, and therefore, even in case of the above separator, separability and electrolytic solution absorptivity were insufficient.

As apparent from the foregoing, a separator for alkaline batteries satisfying both separability and electrolytic solution absorptivity has not so far been obtained in alkaline batteries using a zinc negative electrode with no addition of mercury.

This invention aims to provide a separator for alkaline batteries which is excellent in both separability and electrolytic absorptivity, low in the swelling degree, and capable of lowering the internal resistance of the battery, for obtaining an alkaline battery, among alkaline batteries wherein no mercury is added to the zinc negative electrode, which causes no internal circuit, increases the lifetime of the battery up to the end voltage, and further does not lower the electric capacity.

SUMMARY OF THE INVENTION

The above object of this invention can be attained by a separator for alkaline batteries containing as at least part of the main fibers a fibrilated product of solvent-spun cellulose fiber obtained by dissolving cellulose in a solvent and depositing cellulose directly.

Further, as such solvent-spun cellulose fibers, there can be mentioned preferably a fiber having a wet Young's modulus of 20 g/d or more and an orientation degree $\Delta n$ of $42 \times 10^{-3}$ or more, and particularly preferably a solvent-spun cellulose fiber obtained by dry-jet wet spinning into water a spinning solution obtained by dissolving cellulose in an amine oxide to deposit cellulose. The dry-jet wet spinning method means jetting a spinning solution from a spinneret into an inert atmosphere such as air and introducing the jetted fibrous substance into a coagulating bath.

Further as such a separator, a separator for alkali batteries is preferred which comprises as substantially main fibers a fibrilated product of the above solvent-spun cellulose fiber and a polyvinyl alcohol fiber of 1 denier or less wherein the weight ratio of the fibrilated product to the polyvinyl alcohol fiber is 95:5 to 25:75, and further a polyvinyl alcohol binder wherein the weight ratio of the binder to the main fibers is 3:97 to 30:70.

In the separator of this invention, as at least part of the main fibers there is used a fibrilated product of solvent-spun cellulose fiber obtained by dissolving cellulose in a solvent and depositing cellulose directly, particularly a fibrilated product of cellulose fiber whose wet Young's modulus is 20 g/d or more and orientation degree $\Delta n$ is $42\times 10^{-3}$ or more. The following are advantages obtained by using a fibrilated product of cellulose fiber having such characteristics.

Namely, because of its high wet Young's modulus, there is only a small extent of setting (i.e. increasing of flexibility) in water and extremely long fibrils are formed by beating. Therefore, such fibrils can be formed into a separator extremely excellent in separator performance. Further, the formed fibrils also have a high wet Young's modulus, and therefore, do not set in an alkali solution after being formed into a separator, and are extremely excellent in an electrolytic solution retention property, too. Further, because of the high orientation degree, fibrils formed by beating also have a high orientation degree and therefore have high alkali resistance, and are excellent in an electrolytic solution retention property in view of this point, too. Particularly when such cellulose fiber was highly fibrilated by higher beating degree in this invention, a thin and long fibrilated product is obtained and as a result a separator having particularly excellent performance is obtained.

Solvent-spun cellulose fibers used in this invention include, in view of the recycle of resources, too, one obtained by solvent spinning cellulose II alone or a mixture of cellulose II with cellulose I (wood pulp, cotton or the like) as a raw material, but particularly preferable is solvent-spun cellulose fiber obtained by depositing cellulose II directly from cellulose I alone used as a raw material.

The solvent-spun cellulose fiber referred to in this invention is different from a so-called regenerated cellulose fiber such as usual viscose rayon or cuprammonium rayon obtained by chemically converting cellulose once to a cellulose derivative and then converting the derivative again to cellulose, and means a fiber obtained by depositing cellulose from a solution obtained by simply dissolving cellulose in a solvent.

Such solvent-spun cellulose fibers have performances utterly different from usual regenerated cellulose fibers such as viscose rayon, polynosic rayon, high tenacity rayon obtained by generating cellulose II through viscose and cuprammonium rayon obtained by generating cellulose II through cellulose-cuprammonium complex. This solvent-spun cellulose fiber is a cellulose fiber wherein fibrils inside the fiber develop extremely well up to the innermost layer part of the fiber, and is known to have high wet Young's modulus, crystallinity and orientation degree (Textile Research Journal No. 2, p61, 1987). Such a solvent-spun cellulose fiber can be beaten using a later-described suitable method to obtain a desired fibrilated product.

Any of solvents may be used as the solvent for producing solvent-spun cellulose fibers in the present invention provided that they are capable of dissolving cellulose without being accompanied with any chemical reaction, as exemplified by solvents of inorganic type such as an aqueous zinc chloride solution or solvents of organic type such as amine oxides as typified by, e.g., N-methylmorpholine-N-oxide or solvent mixtures thereof with water, with particular preference to amine oxides.

As a preferred example of cellulose fiber having the above characteristics, there can be mentioned a solvent-spun fiber prepared by a process which comprises dry-jet wet spinning a spinning solution obtained by dissolving cellulose in an amine oxide into water to deposit cellulose, and then stretching the resultant fiber, and a typical example of such a fiber is a solvent-spun cellulose fiber sold by Courtaulds PLC England under the trade name of Tencel and sold by Lenzing Co., Austria under the trade mark of Solution.

A solvent-spun cellulose fiber used in this invention has a high wet Young's modulus and thus only a small extent of setting occurs in water, and therefore, the fiber is effectively beaten by stress at the time of beating using a beater or a refiner to form extremely long fibrils. Since the crystallinity and orientation degree of the fiber are high, fibrils themselves formed by beating have high crystallinity and a high orientation degree, and have high alkali resistance and high fiber form retention power in an electrolytic solution having a strong alkaline property. These long and highly crystalline fibrils have a remarkable effect on the later-described separability. Thus, the solvent-spun cellulose fiber is a fiber having a high Young's modulus and wherein fibrils develop extremely well up to the innermost layer part. The solvent-spun cellulose fiber is not a mere extra fine fiber obtained by complete division of fiber by beating, but has a form wherein long external fibrils are partly bound mutually and each bound part retains the original fiber diameter, and has a prescribed fibril diameter after beating. As described below, such a solvent-spun cellulose fiber is extremely effective as a separator for alkaline batteries with no addition of mercury.

The first advantage of the separator of this invention using the above solvent-spun cellulose fiber is that the electrolytic solution effective for the reaction is sufficiently retained in the separator until the end voltage is reached. In a usual separator, the greater part of the electrolytic solution is retained in the voids between the fibers and there is a tendency that the electrolytic solution easily moves to the negative electrode side during its use, and thus there is a problem that the electrolytic solution necessary for the reaction becomes insufficient in its amount and large electric current discharge is inhibited. On the other hand, when the beaten solvent-spun cellulose fiber of this invention is used, the electrolytic solution is firmly retained between the fibrils, and therefore, the electrolytic solution is slow to move to the negative electrode side, a sufficient amount of the electrolytic solution exists in the interfaces between both electrodes and the separator until the end voltage is reached, and cell reaction progresses smoothly.

Although some of usual regenerated cellulose such as viscose rayon, polynosic rayon, high tenacity rayon and cuprammonium rayon are fibrilated by beating, these regenerated celluloses have a low wet Young's modulus in general, at most of 18 g/d or so, there is a large extent of setting in water, and they are extremely hard to fibrilate even if the external stress at the time of beating is strong. Moreover, fibrils obtained by beating such a regenerated cellulose are short fibrils obtained by fibrilation of the outermost layer of the fiber and have a form such that hairs grow thick on the fiber surface, and therefore, even when the same beating degree as in the solvent-spun cellulose fiber of this invention is adopted, it is impossible to retain the electrolytic solution firmly between the fibrils and make it hard for the electrolytic solution to move to the negative electrode side.

Thus, the wet Young's modulus of the solvent-spun cellulose fiber used in this invention is 20 g/d or more, preferably 25 g/d or more. However, one having a wet Young's modulus of 150 g/d or more is hard to prepare by the present industrial techniques. Further, when the beating degree of the solvent-spun cellulose fiber used in this invention is larger than 700 ml in terms of CSF, fibrils enough to retain the electrolytic solution are not produced, and when it is below 25 ml, the internal resistance of the battery described below increases and at the same time uniform formation cannot be obtained. Therefore, the beating degree is preferably 25 to 700 ml, more preferably 25 to 500 ml, and further more preferably 50 to 200 ml in terms of CSF.

The second advantage of the separator of this invention using a solvent-spun cellulose fiber is to inhibit the increase of the internal resistance of the battery. In case of use of a cellulose fiber capable of being beaten such as, for example, hemp pulp, cotton linter pulp or wood pulp, when such a cellulose fiber is beaten to a beating degree of 25 to 700 ml in CSF as described above, it is possible to retain the electrolytic solution firmly between the fine pulps and make it hard for the electrolytic solution to move to the negative electrode side, as is the case with the fibrils of the solvent-spun cellulose fiber of the same beating degree, but since fibers are merely fractionized by beating of these cellulose fibers, there arises a problem that the density of the separator increases and the internal resistance of the battery increases. On the other hand, when the beaten solvent-spun cellulose fiber of this invention is used, the main skeleton of the fiber constitutes the separator and is a form having moderate voids, and therefore the density of the separator does not increase and the internal resistance of the battery does not increase.

Further, when a usual regenerated cellulose fiber such as viscose rayon, polynosic rayon, high tenacity rayon or cuprammonium rayon is fibrilated by beating, the main skeleton of the fiber constitutes the separator and has moderate voids, and therefore there is a tendency that the internal resistance of the battery does not increase, as is the case with the solvent-spun cellulose fiber, but these fibrils lack alkali resistance, and therefore do not contribute to the later-described separability and are not preferable for use as a separator.

When the single fiber denier before beating of the solvent-spun cellulose fiber of this invention is below 0.4 denier, there arises a problem that the density of the separator increases and the internal resistance of the battery increases, and thus the single fiber denier is preferably 0.4 denier or more, more preferably 1.0 denier or more.

The third advantage is that extremely good separability can be obtained. As already described, some of usual regenerated cellulose fibers such as viscose rayon, polynosic rayon, high tenacity rayon and cuprammonium rayon are fibrilated by beating, but they generally have, as regenerated cellulose, only low crystallinity and orientation degree, at most a crystallinity of 50% or so and an orientation degree $\Delta n$ below $40 \times 10^{-3}$. Therefore, these regenerated cellulose fibers lack alkali resistance as a fiber and cannot retain the form of fiber, for example, by dissolution into the electrolytic solution, and thus it is impossible to use an extra fine regenerated cellulose fiber. Particularly, fibrils formed by beating are extremely extra fine and further liable to dissolve into the electrolytic solution, and thus it is impossible to obtain separability by use of these fibrils. Further, the crystallinity of the fibrous inner layer part of such a regenerated cellulose fiber is further lower than that of the fibrous outer layer part, and therefore by the fibrilation of the fibrous outer layer part the fibrous inner layer part lacking alkali resistance is exposed and according to the progress of beating the fibrous components become liable to dissolve into the electrolytic solution, and thus use thereof as a separator is not preferable.

As against these regenerated cellulose fibers, when a cellulose fiber whose crystallinity is 50% or more, more preferably 55% or more, and orientation degree $\Delta n$ is $42 \times 10^{-3}$ or more, more preferably $44 \times 10^{-3}$, namely a solvent-spun cellulose fiber of this invention is used, sufficiently crystallized fibrils grow up to the fibrous inner layer part and thus the fibrils after beating are extremely excellent in alkali resistance, and the inside of the fiber exposed by beating is excellent in alkali resistance. Thus by uniformly filling the voids constituted by the main skeleton of the fiber with entangled long fibers formed by beating, extremely good separability is maintained over a long term while the increase of the internal resistance of the battery is inhibited.

When the diameter of fibrils after beating of the solvent-spun cellulose fiber of this invention is about 5 $\mu$m, effective separability cannot be obtained, and the diameter is preferably 5 $\mu$m or less, more preferably 3 $\mu$m or less. Further when the single fiber denier before beating of the solvent-spun cellulose fiber of this invention is above 3.0 deniers, separability is inhibited, and the single fiber denier is preferably 3.0 deniers or less, more preferably 2.0 deniers or less. As already described, fibrils obtained by beating a usual regenerated cellulose fiber such as viscose rayon, polynosic rayon, high tenacity rayon or cuprammonium rayon are short fibrils obtained by fibrilation of the outermost layer of the fiber and have a form such that hairs grow thick on the fiber surface, and therefore even in such a state of the fibrous form at the initial stage of integration into a battery, the voids constituted by the main skeleton of the fiber cannot be uniformly filled with the fibrils and a state such that short circuit is liable to occur is brought about, and thus the fibrils cannot be used as a separator. It is difficult to obtain cellulose fiber having an orientation degree of $55 \times 10^{-3}$ or more by the present industrial techniques.

Further, the merit of the separator of this invention is that the swelling degree of the separator is small and it is possible to pack a large amount of a negative electrode active substance. When a usual cellulose fiber is used for a separator, the fibers swell by the electrolytic solution and thus the swelling degree of the separator enlarges, too, and in preparation of a battery there arises a problem that the packing amount of a negative electrode active substance decreases and thus the electric capacity decreases. When a cellulose fiber capable of being beaten such as, for example, hemp pulp, cotton linter pulp or wood pulp is used, fibers are merely fractionized by beating, and the swelling of the separator cannot be inhibited even if they are entangled. On the other hand, when the beaten solvent-spun cellulose fiber of this invention is used, fibrils are entangled with the main skeleton of the fiber constituting a separator and support the main skeleton of the fiber, and therefore the fibrils swell as fiber, but as a separator the swelling degree tends to be controlled in a low level. As stated above, when a usual regenerated cellulose fiber such as viscose rayon, polynosic rayon, high tenacity rayon or cuprammonium rayon is beaten, fibrils formed are extremely short and cannot be entangled with the main skeleton of the fiber constituting the separator to support the main skeleton of the fiber, and as a result the swelling degree of the separator becomes undesirably high.

As a binder used in this invention, a polyvinyl alcohol binder is used in view of electrolytic solution resistance. As the forms of the binder, there can be mentioned a fibrous form, a powder form and a solution form, but when a separator is prepared by a wet paper making method, it is preferable to use a fibrous binder. When the polyvinyl alcohol binder is in a powdery state or a solution state, it is necessary to dissolve it for manifestation of the strength of the separator, and at that time, the polyvinyl alcohol forms a film and plugs up the voids between the fibers of the separator, and as a result the lowering of electrolytic solution absorptivity and the increase of the internal resistance of the battery take place.

On the other hand, in case of use of a fibrous binder, when the fibrous binder is completely dissolved, the same phenomenon as above occurs undesirably, but when, by a means, for example, of lowering the moisture percentage carried in before drying or lowering the drying temperature, point adhesion at the intersection of the binder fiber with the fibrous form being left and the main fiber is solely made, the strength of the separator can be increased without bringing about the lowering of electrolytic solution absorptivity and the rise of the internal resistance of the battery. Thus when the temperature for dissolution of the a polyvinyl alcohol binder fiber in water is below 60° C., the binder, undesirably, completely dissolves even when the above method is adopted, and when the temperature is higher than 98° C., the functions as a binder are not manifested, and thus the temperature is preferably 60° to 98° C., more preferably 70° to 90° C., and as a drying temperature at the time of making paper there is adopted a temperature in the range of 70° to 150° C., preferably 80° to 120° C. as the dryer temperature.

As for the amount of addition of the binder, when the weight ratio of the polyvinyl alcohol binder to the total main fiber is smaller than 3/97, a necessary strength of the separator cannot be obtained, and when the weight ratio is larger than 30/70, the amount of the main fiber effective for the performance of the battery becomes small, and therefore, it is preferable to make the weight ratio 3/97 to 30/70.

Although, as stated above, as a main fiber constituting the separator of this invention, a beaten solvent-spun cellulose fiber is fundamentally used in view of separability, electrolytic solution absorptivity, lowering of the internal resistance of the battery and lower swelling degree, it is preferable for enhancement of the formation to use as the main fiber a combination of a beaten solvent-spun cellulose fiber with another synthetic fiber or other synthetic fibers. When the beating degree of a solvent-spun cellulose fiber progresses, the formation of the separator generally tends to get worse due to the aggregation of the cellulose fiber, but the aggregation can be prevented by compounding the synthetic fiber. As already described, it is necessary for the retention of the electrolytic solution and the lowering of the internal resistance and further the enhancement of the formation that the beating degree is in the range of 700 to 25 ml, but even when a solvent-spun cellulose fiber having CSF of 700 ml is used, it is preferable that the content of the synthetic fiber is 5 wt. % or more of the main fiber.

As synthetic fibers used in this invention, there can be mentioned polyvinyl alcohol fibers, polyamide fibers, polyolefin fibers, etc. in view of electrolytic solution resistance. Particularly preferable are polyvinyl alcohol fibers.

Further, another cellulose fiber can be incorporated in paper making in such a range that the above performance is not largely spoiled. However, a most preferred separator is one containing as main fibers a beaten solvent-spun cellulose fiber and a polyvinyl alcohol fiber alone.

As reasons for using a polyvinyl alcohol fiber as part of the main fibers, it can first be mentioned that the polyvinyl alcohol fiber is extremely excellent in electrolytic solution resistance among various fibers, and excellent in electrolytic solution absorptivity, but further as a big reason it can be mentioned that the polyvinyl alcohol fiber has an effect of lowering the swelling degree of the separator. As stated above, a polyvinyl alcohol binder is used as a binder in the separator of this invention, and between this and a polyvinyl alcohol fiber the power of hydrogen bond effectively works and therefore adhesive strength is high. Thus both of the polyvinyl alcohol binder and the polyvinyl alcohol fiber form the skeleton of the separator, and work as a support of other main fibers containing a beaten solvent-spun cellulose fiber, and as a whole it is possible to keep the swelling of the separator low. When a polyvinyl alcohol fiber is not used, the adhesive strength between the other main fiber and the polyvinyl alcohol binder is weak and it is difficult to inhibit swelling. As stated above, when a beaten solvent-spun cellulose fiber is used, swelling tends to be inhibited by the entangling power of its fibrils, but when a polyvinyl alcohol binder and a polyvinyl alcohol fiber are combined, a further lower swelling degree is obtained and such a combination is extremely effective.

As for preferred denier of the polyvinyl alcohol fiber, as stated above, when no mercury is added to the zinc cathode, extremely high separability is required compared to the ease where 1.5 wt. % of mercury is added, it is preferable to use a polyvinyl alcohol fiber of 1 denier or less, preferably 0.5 denier or less, more preferably 0.3 denier or less. However, merely making the fiber thin is not preferable because of bringing about the lowering of electrolytic solution absorptivity and the increase of the internal resistance of the battery.

In this connection, as stated above, there arises, for the first time, a reason to use a fiber of thin denier by combination with a beaten solvent-spun cellulose fiber. Namely, since the requirement of the enhancing of electrolytic solution absorptivity and the lowering of the internal resistance of the battery is satisfied by the beaten solvent-spun cellulose fiber, the lowering of electrolytic solution absorptivity and the increase of the internal resistance of the battery are not caused even by making the denier of the polyvinyl alcohol fiber 1 denier or less, and in combination with the effect of fibrils of the beaten solvent-spun cellulose fiber, further high separability is obtained and internal short circuit is not caused even in case of no addition of mercury. Particularly, in case of a polyvinyl alcohol fiber of a thick denier having so far been used, the effects are small since the number of fibers becomes small in the same incorporation rate, and by making fibers thin the effects enlarge with a small incorporation rate and further thereby it is possible to increase the incorporation rate of the beaten solvent-spun cellulose fiber as an electrolytic solution-retaining material. Therefore, the denier of the polyvinyl alcohol fiber used in this invention is preferably 1 denier or less. However, it is difficult to obtain a polyvinyl alcohol fiber below 0.01 denier directly from the present industrial techniques, but it is possible to obtain such extra fine fibers by a method such as fibrilation.

As for the incorporation rate of the beaten solvent-spun cellulose fiber used in this invention to the whole main fibers, when the rate is 95 wt. % or more, the swelling degree gets large, and when the rate is 25 wt. % or less, the electrolytic solution absorptivity tends to lower and the internal resistance tends to increase, and thus the rate is preferably 95 to 25 wt. %, more preferably 90 to 30 wt. %, most preferably 75 to 40 wt. %.

A separator of this invention can be prepared by beating a solvent-spun cellulose fiber to a prescribed CSF, mixing it with a synthetic fiber of 1 denier or less and if necessary another cellulose fiber or synthetic fiber, adding a binder and dispersing it in water, and then subjecting the mixture to usual wet paper making.

When the beating of the solvent-spun cellulose fiber used in this invention is carried out by a beater, double disk refiner or the like usually used, the main skeleton of the fiber is sometimes cut off because the fiber is intensely rubbed by the metal. In this occasion, since although CSF is lowered, only apparent beating progresses, effective fibrils are not actually formed. According to the investigation of the present inventors, it is preferable that the beating is carried out by using in combination a pulper whose blade is made blunt and a fiberizer (high speed disaggregating machine) wherein the tooth interval was adjusted to the fiber length of the solvent-spun cellulose fiber. It revealed that the method using such a combination is an extremely effective beating method compared to beating by a beater, a double disk refiner or the like because, in the former method, by carrying out beating by internal turbulent flow and shearing action with avoidance of contact among the metals, long fibrils are formed by peeling of the fiber from the surface in the axial direction without causing the cutting of the fibrous main skeleton.

EXAMPLES

The embodiments and effects of this invention are described in more detail by the following examples.

The orientation degree Δn of a fiber was determined by measuring the retardation of the fiber using a compensator and measuring the thickness of the fiber at the part irradiated with light, and applying the resultant values to the following equation.

$\Delta n =$ retardation/thickness of the fiber

The beating degree CSF was measured according to the method described in JIS P8121.

Further, according to observation by an optical microscope, a solvent-spun cellulose fiber after beating has a form such that the main skeleton of the fiber remains and long fibrils are formed using the main skeleton as a binding part, and thus the diameter of fibrils after beating was determined by measuring the thickness of each of 10 fibrils by observation using an optical microscope and calculating their average value as the diameter.

The wet Young's modulus was measured by the method according to JIS L-1073. Further, crystallinity was determined by obtaining an X-ray diffraction strength curve, separating it into the crystalline part and the non-crystalline part, measuring each area, and applying the resultant values to the following equation.

Crystallinity = 100 × (area of the crystalline part)/

(area of the crystalline part + area of the non-crystalline part)

Example 1

A solvent-spun cellulose fiber having a wet Young's modulus of 26 g/d, an orientation degree Δn of $45 \times 10^{-3}$, a crystallinity of 58.5%, a size of 1.5 deniers and a length of 2 mm (made of Courtaulds PLC, Tencel) was beaten by a pulper and a fiberizer to obtain a fibrilated product having a CSF of 150 ml. The fibril diameter of this fiber after beating was 0.5 μm, and the cutting of the fibrous main skeleton was scarcely observed. 59 wt. % of this fiber based on the whole main fiber was mixed with 41 wt. % of a polyvinyl alcohol fiber having a size of 0.3 denier and a length of 2 mm based on the whole main fiber, and to the main fiber comprising this mixture was further added a polyvinyl alcohol fibrous binder having a dissolution-in-water temperature of 75° C., a size of 1.0 denier and a length of 3 mm in an amount such that the weight ratio of the whole main fiber to the binder is 85:15 to prepare a slurry.

Paper was made from this slurry using a cylinder paper machine and dried at a dryer temperature of 110° C. to obtain a separator having a weight of 32.3 g/m² and a thickness of 0.107 mm. In this separator, the polyvinyl alcohol fibrous binder existed in a semi-dissolved state, and the form of fiber remained.

Example 2

The same operation as in Example 1 was made except that the composition ratio of the main fiber was changed to the solvent-spun cellulose fiber: polyvinyl alcohol fiber=80:20 (weight ratio) in Example 1, to obtain a separator having a weight of 34.2 g/m² and a thickness of 0.108 mm. In this separator, the polyvinyl alcohol fibrous binder existed in a semi-dissolved state, and the form of fiber remained.

Example 3

The same operation as in Example 1 was made to prepare a separator except that a fibrilated product was used obtained by making the beating degree of the solvent-spun cellulose fiber (CSF value) 200 ml and making the fibril diameter 0.8 μm (however, the cutting of the fibrous main skeleton was scarcely observed) in Example 1. The resultant separator had a weight of 33.5 g/m² and a thickness of 0.108 mm. In this separator, the polyvinyl alcohol fibrous binder existed in a semi-dissolved state, and the form of fiber remained.

Example 4

The same operation as in Example 1 was made to prepare a separator except that the fibrilated product was obtained by making the beating degree of the solvent-spun cellulose fiber (CSF value) 50 ml and making the fibril diameter 0.1 μm (some cutting of the fibrous main skeleton was observed) in Example 1. The obtained separator had a weight of 35.2 g/m² and a thickness of 0.108 mm. In this separator, the polyvinyl alcohol fibrous binder existed in a semi-dissolved state, and the form of fiber remained.

Example 5

The same operation as in Example 1 was made to prepare a separator except that the polyvinyl alcohol fibrous binder in Example 1 was replaced by a polyvinyl alcohol fibrous binder having a dissolution-in-water temperature of 60° C., a size of 1.0 denier and a length of 3 mm. The resultant separator had a weight of 35.4 g/m² and a thickness of 0.107 mm. In this separator, the polyvinyl alcohol fibrous binder dissolved completely and existed in a film-like state.

Example 6

The same operation as in Example 1 was made to prepare a separator except that the fibrilated product (fibril diameter was about 0.5 μm and the cutting of the fibrous main skeleton was observed in almost half the number of fibers) was obtained by using as the solvent-spun cellulose fiber in Example 1 a solvent-spun cellulose fiber having a wet Young's modulus of 24 g/d, an orientation degree Δn of $42 \times 10^{-3}$, a crystallinity of 53.5%, a size of 4.0 deniers and a length of 5 mm and beating it in the same manner as in Example 1 to make the CSF value 150 ml. The resultant separator had a weight of 32.4 g/m² and a thickness of 0.108 mm. In this separator, the polyvinyl alcohol fibrous binder existed in a semi-dissolved state and the form of fiber remained.

Example 7

The same preparation as in Example 1 was made to prepare a separator except that the fibrilated product was obtained by making the beating degree (CSF value) of the solvent-spun cellulose fiber 20 ml and making the fibril diameter 0.05 μm (it was observed that the greater part of the fibrous main skeleton was cut) in Example 1. The obtained separator had a weight of 35.8 g/m² and a thickness of 0.107 mm. In this separator, the polyvinyl alcohol fibrous binder existed in a semi-dissolved state and the form of fiber remained.

Example 8

The same operation as in Example 1 was made to prepare a separator except that fibrilated product was obtained by making the beating degree (CSF value) of the solvent-spun cellulose fiber 750 ml and making the fibril diameter 4 μm in Example 1 (cutting of the fibrous main skeleton was not observed). The obtained separator had a weight of 32.6 g/m² and a thickness of 0.107 mm. In this separator, the polyvinyl alcohol fibrous binder existed in a semi-dissolved state and the form of fiber remained.

Example 9

The same operation as in Example 1 was made to obtain a separator having a weight of 33.2 g/m² and a thickness of 0.107 mm except that in Example 1 the composition ratio of the main fiber was changed to the solvent-spun cellulose fiber: polyvinyl alcohol fiber=40:60 (weight ratio). In this separator, the polyvinyl alcohol fibrous binder existed in a semi-dissolved state and the form of fiber remained.

Example 10

The same operation as in Example 1 was made to obtain a separator having a weight of 34.9 g/m² and a thickness of 0.106 mm except that in Example 1 the composition ratio of the main fiber was changed to the solvent-spun cellulose fiber: polyvinyl alcohol fiber=97:3 (weight ratio). In this separator, the polyvinyl alcohol fibrous binder existed in a semi-dissolved state and the form of fiber remained.

Example 11

The same operation as in Example 1 was made to prepare a separator having a weight of 33.9 g/m² and a thickness of 0.106 mm except that the polyvinyl alcohol fiber used as part of the main fibers in Example 1 was replaced by a polyvinyl alcohol fiber having a size of 0.5 denier and a length of 3 mm. In this separator, the polyvinyl alcohol fibrous binder existed in a semi-dissolved state and the form of fiber remained.

Example 12

The same operation as in Example 1 was made to prepare a separator having a weight of 34.3 g/m² and a thickness of 0.106 mm except that the polyvinyl alcohol fiber used as part of the main fibers in Example 1 was replaced by a polyvinyl alcohol fiber having a size of 1.0 denier and a length of 5 mm. In this separator, the polyvinyl alcohol fibrous binder existed in a semi-dissolved state and the form of fiber remained.

Example 13

The same operation as in Example 1 was made to prepare a separator having a weight of 32.9 g/m² and a thickness of 0.106 mm except that the polyvinyl alcohol fiber used as part of the main fiber in Example 1 was replaced by a polypropylene fiber having a size of 1.0 denier and a length of 5 mm. In this separator, the polyvinyl alcohol fibrous binder existed in a semi-dissolved state and the form of fiber remained.

Example 14

The same operation as in Example 1 was made to prepare a separator having a weight of 35.3 g/m² and a thickness of 0.108 mm except that 37 wt. % of the polyvinyl alcohol fiber used as part of the main fiber in Example 1 was replaced by a mercerized cotton linter pulp (orientation degree: $30 \times 10^{-3}$ or less). In this separator, the polyvinyl alcohol fibrous binder existed in a semi-dissolved state and the form of fiber remained.

Comparative Example 1

The same operation as in Example 1 was made to prepare a separator having a weight of 37.5 g/m² and a thickness of 0.105 mm except that the fibrilated product of the solvent-spun cellulose fiber was replaced by a fibrilated product obtained by beating in Example 1 a mercerized cotton linter pulp having orientation degree of $30 \times 10^{-3}$ or less by a pulper and a fiberizer to make the CSF value 150 ml. In this separator, the polyvinyl alcohol fibrous binder existed in a semi-dissolved state and the form of fiber remained.

Comparative Example 2

The same operation as in Example 1 was made to prepare a separator having a weight of 32.7 g/m² and a thickness of 0.105 mm except that the fibrilated product of the solvent-spun cellulose fiber was replaced by a fibrilated product obtained by beating, in Example 1, a viscose rayon having a wet Young's modulus of 6 g/d, an orientation degree $\Delta n$ of $19 \times 10^{-3}$, a crystallinity of 32.1%, a size of 1.5 deniers (dr) and a length of 2 mm to make the CSF value 720 ml (when this viscose rayon was further continued to be beaten, the CSF value did not become less than 720 ml). In this separator, the polyvinyl alcohol fibrous binder existed in a semi-dissolved state and the form of fiber remained.

Comparative Example 3

The same operation as in Example 1 was made to prepare a separator having a weight of 35.9 g/m² and a thickness of 0.104 mm except that the fibrilated product of the solvent-spun cellulose fiber was replaced by a fibrilated product obtained by beating, in Example 1, a polynosic rayon having a wet Young's modulus of 18 g/d, an orientation degree $\Delta n$ of $39 \times 10^{-3}$, a crystallinity of 46.1%, a size of 0.5 denier (dr) and a length of 2 mm to make the CSF value 150 ml. In this separator, the polyvinyl alcohol fibrous binder existed in a semi-dissolved state and the form of fiber remained.

Comparative Example 4

The same operation as in Example 1 was made to prepare a separator having a weight of 33.8 g/m² and a thickness of 0.107 mm except that the polyvinyl alcohol fiber having a size of 0.3 denier and a length of 2 mm was substituted, in Example 1, for the whole amount of the main fiber without using the fibrilated product of the solvent-spun cellulose fiber. In this separator, the polyvinyl alcohol fibrous binder existed in a semi-dissolved state and the form of fiber remained.

On the foregoing 18 separators, the electrolytic solution absorption amount and the swelling degree were measured according to the following methods.

(1) Electrolytic Solution Absorption Amount

A separator is sampled in a size of 5 cm × 5 cm and the specimen is weighed. The specimen is immersed in an aqueous 35 wt. % potassium hydroxide solution at 25° C. for 30 minutes. The specimen is subjected to drip of liquid for 15 seconds and then weighed. The electrolytic solution absorption amount is calculated by the following equation.

Electrolytic solution absorption amount (g/g) =

(weight after immersion − Weight before immersion)/

Weight before immersion (2) Swelling Degree

A separator is sampled in a size of 5 cm × 5 cm and the specimen is measured for thickness by a thickness gage having a load of 180 g/cm². The specimen is immersed in an aqueous 35 wt. % potassium hydroxide solution at 25° C. for 30 minutes. The specimen is subjected to drip of liquid for 15 seconds and measured for thickness according to the same method as above, and the swelling degree is calculated by the following equation.

Swelling degree (%) = (Thickness after immersion − thickness before immersion)/Thickness before immersion × 100

Then, using these separators there were prepared unit 3 alkali manganese batteries wherein a zinc cathode of no addition of mercury was used.

Figure 1:
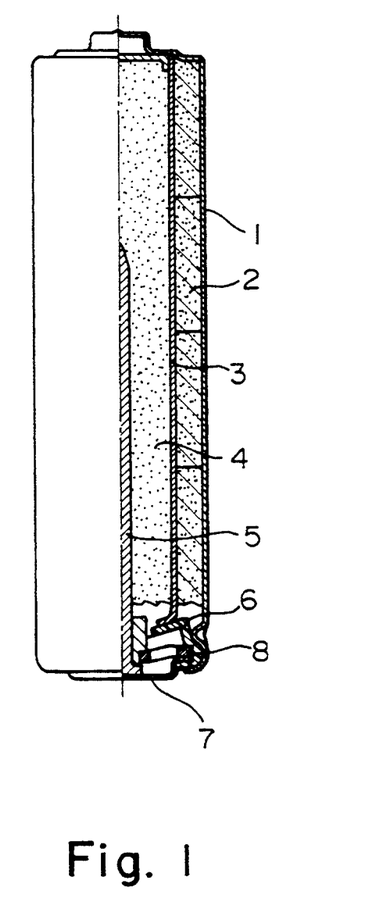
FIG. 1 is a half cross section of a cell using the separator of the present invention.

FIG. 1 shows the half cross section of the unit 3 alkali dry battery wherein the separator of this invention was used. In FIG. 1, 1 is a positive electrode can serving also as a positive terminal. Inside this positive electrode can 1 there is a cylindrical positive electrode composition 2, forced thereinto, comprising manganese dioxide and graphite. 3 is a bottom-possessing cylindrical separator according to this invention, and inside the separator is packed a zinc negative electrode 4 obtained by dispersing zinc alloy powder with no addition of mercury in a gel-like electrolytic solution and mixing them. 5 is a negative electrode collector ring, 6 is a resin sealer blocking the opening part of positive electrode can 1, and in contact with this resin sealer 6 are arranged a bottom plate 7, serving also as a negative electrode terminal, welded to the head of the above negative electrode collector ring 5, and a metal-made washer 8. The opening part of the above positive electrode can is curved inside to seal the opening part.

The thus prepared batteries were, based on the standard of ANSI in USA; subjected to continuous discharge at 10Ω and discharge at 10Ω of one hour a day, and time until the end voltage of 0.9 V was measured.

The results of electrolytic solution absorption amount, swelling degree and discharge time are shown in Tables 1 to 5. In the tables, the symbols have the following meanings.

| ⊚: extremely good | ○: good |
|---|---|
| Δ: a little bad | X: extremely bad |

It is apparent from Tables 1 to 5 that the product of this invention is excellent in separability, electrolytic solution absorptivity and low swelling degree, and therefore on battery performance free of short due to excellent separability and excellent in large current dischargeability due to excellent electrolytic absorptivity, low swelling degree and low internal resistance.

TABLE 1

| | | Example 1 | Example 2 | Example 3 | Example 4 |
|---|---|---|---|---|---|
| Constitution of separator | | | | | |
| Fibrilated product of cellulose fiber | Kind of fiber | solvent-spun cellulose fiber | solvent-spun cellulose fiber | solvent-spun cellulose fiber | solvent-spun cellulose fiber |
| | Single fiber denier before beating (dr) | 1.5 | 1.5 | 1.5 | 1.5 |
| | Wet Young's modulus (g/d) | 26 | 26 | 26 | 26 |
| | Orientation degree $\Delta n$ ($\times 10^{-3}$) | 45 | 45 | 45 | 45 |
| | Fibril diameter after beating (μ) | 0.5 | 0.5 | 0.8 | 0.1 |
| | CSF (ml) | 150 | 150 | 200 | 50 |
| | Content (%/whole main fiber) | 59 | 80 | 59 | 59 |
| Synthetic fiber | Kind of fiber | Polyvinyl alcohol fiber | Polyvinyl alcohol fiber | Polyvinyl alcohol fiber | Polyvinyl alcohol fiber |
| | Denier (dr) | 0.3 | 0.3 | 0.3 | 0.3 |

TABLE 1-continued

|  |  | Example 1 | Example 2 | Example 3 | Example 4 |
|---|---|---|---|---|---|
|  | Content (%/whole main fiber) | 41 | 20 | 41 | 41 |
| Other fiber | Kind of fiber | — | — | — | — |
|  | Content (%/whole main fiber) | — | — | — | — |
| Content of polyvinyl alcohol binder fiber (%/Separator) |  | 15 | 15 | 15 | 15 |
| Dissolution state of polyvinyl alcohol binder fiber | | Remaining fiber state | Remaining fiber state | Remaining fiber state | Remaining fiber state |
| Measured value | | | | | |
| Electrolytic solution absorption amount (g/g) | | 8.1 | 8.2 | 8.5 | 7.4 |
| Swelling degree (%) | | 19 | 22 | 23 | 20 |
| Dicharge time | 10 Ω continuous discharge (min) | 1044 | 1022 | 1028 | 1046 |
|  | 10 Ω 1 hour-a-day discharge (hour) | 17.7 | 18.8 | 19.5 | 16.6 |
| Evaluation | | | | | |
| Swelling degree | | ⊙ | ○ | ○ | ⊙ |
| Short preventablility (Continuous discharge life) | | ⊙ | ○ | ○ | ⊙ |
| Large current dischargeability (Intermittent discharge life) | | ⊙ | ⊙ | ⊙ | ○ |
| Overall evaluation | | ⊙ | ○ | ○ | ○ |

TABLE 2

|  |  | Example 5 | Example 6 | Example 7 | Example 8 |
|---|---|---|---|---|---|
| Constitution of separator | | | | | |
| Fibrilated product of cellulose fiber | Kind of fiber | solvent-spun cellulose fiber | solvent-spun cellulose fiber | solvent-spun cellulose fiber | solvent-spun cellulose fiber |
|  | Single fiber denier before beating (dr) | 1.5 | 4.0 | 1.5 | 1.5 |
|  | Wet Young's modulus (g/d) | 26 | 24 | 26 | 26 |
|  | Orientation degree Δn ($\times 10^{-3}$) | 45 | 42 | 45 | 45 |
|  | Fibril diameter after beating (μ) | 0.5 | 0.5 | 0.05 | 4 |
|  | CSF (ml) | 150 | 150 | 20 | 750 |
|  | Content (%/whole main fiber) | 59 | 59 | 59 | 59 |
| Synthetic fiber | Kind of fiber | Polyvinyl alcohol fiber | Polyvinyl alcohol fiber | Polyvinyl alcohol fiber | Polyvinyl alcohol fiber |
|  | Denier (dr) | 0.3 | 0.3 | 0.3 | 0.3 |
|  | Content (%/whole main fiber) | 41 | 41 | 41 | 41 |
| Other fiber | Kind of fiber | — | — | — | — |
|  | Content (%/whole main fiber) | — | — | — | — |
| Content of polyvinyl alcohol binder fiber (%/Separator) | | 15 | 15 | 15 | 15 |
| Dissolution state of polyvinyl alcohol binder fiber | | Film-shaped | Remaining fiber state | Remaining fiber state | Remaining fiber state |
| Measured value | | | | | |
| Electrolytic solution absorption amount (g/g) | | 7.5 | 8.2 | 6.0 | 5.9 |
| Swelling degree (%) | | 22 | 25 | 19 | 35 |
| Dicharge time | 10 Ω continuous discharge (min) | 1041 | 907 | 1018 | 999 |
|  | 10 Ω 1 hour-a-day discharge (hour) | 18.3 | 15.4 | 13.9 | 15.1 |
| Evaluation | | | | | |
| Electrolytic solution absorptivity | | ○ | ⊙ | Δ | Δ |
| Swelling degree | | ○ | ○ | ⊙ | Δ |
| Short preventablility (Continuous discharge life) | | ⊙ | Δ | ○ | Δ |
| Large current dischargeability (Intermittent discharge life) | | ⊙ | ○ | Δ | ○ |
| Overall evaluation | | ○ | Δ | Δ | Δ |

TABLE 3

|  |  | Example 9 | Example 10 | Example 11 | Example 12 |
|---|---|---|---|---|---|
| Constitution of separator | | | | | |
| Fibrilated product of cellulose fiber | Kind of fiber | solvent-spun cellulose fiber | solvent-spun cellulose fiber | solvent-spun cellulose fiber | solvent-spun cellulose fiber |
|  | Single fiber denier before beating (dr) | 1.5 | 1.5 | 1.5 | 1.5 |
|  | Wet Young's modulus (g/d) | 26 | 26 | 26 | 26 |
|  | Orientation degree Δn ($\times 10^{-3}$) | 45 | 45 | 45 | 45 |
|  | Fibril diameter after beating (μ) | 0.5 | 0.5 | 0.5 | 0.1 |
|  | CSF (ml) | 150 | 150 | 150 | 150 |
|  | Content (%/whole main fiber) | 40 | 97 | 59 | 59 |
| Synthetic fiber | Kind of fiber | Polyvinyl alcohol fiber | Polyvinyl alcohol fiber | Polyvinyl alcohol fiber | Polyvinyl alcohol fiber |
|  | Denier (dr) | 0.3 | 0.3 | 0.5 | 1.0 |
|  | Content (%/whole main fiber) | 60 | 3 | 41 | 41 |

TABLE 3-continued

| | | Example 9 | Example 10 | Example 11 | Example 12 |
|---|---|---|---|---|---|
| Other fiber | Kind of fiber | — | — | — | — |
| | Content (%/whole main fiber) | — | — | — | — |
| Content of polyvinyl alcohol binder fiber (%/Separator) | | 15 | 15 | 15 | 15 |
| Dissolution state of polyvinyl alcohol binder fiber | | Remaining fiber state | Remaining fiber state | Remaining fiber state | Remaining fiber state |
| Measured value | | | | | |
| Electrolytic solution absorption amount (g/g) | | 5.8 | 8.8 | 8.4 | 9.0 |
| Swelling degree (%) | | 17 | 37 | 24 | 29 |
| Dicharge time | 10 Ω continuous discharge (min) | 1014 | 921 | 918 | 909 |
| | 10 Ω 1 hour-a-day discharge (hour) | 14.1 | 15.7 | 17.2 | 17.1 |
| Evaluation | | | | | |
| Electrolytic solution absorptivity | | Δ | ⊙ | ⊙ | ⊙ |
| Swelling degree | | ⊙ | Δ | ○ | ○ |
| Short preventablility (Continuous discharge life) | | Δ | Δ | Δ | Δ |
| Large current dischargeability (Intermittent discharge life) | | Δ | ○ | ⊙ | ⊙ |
| Overall evaluation | | Δ | Δ | Δ | Δ |

TABLE 4

| | | Example 13 | Example 14 |
|---|---|---|---|
| Constitution of separator | | | |
| Fibrilated product of cellulose fiber | Kind of fiber | solvent-spun cellulose fiber | solvent-spun cellulose fiber |
| | Single fiber denier before beating (dr) | 1.5 | 1.5 |
| | Wet Young's modulus (g/d) | 26 | 26 |
| | Orientation degree Δn (×10$^{-3}$) | 45 | 45 |
| | Fibril diameter after beating (μ) | 0.5 | 0.5 |
| | CSF (ml) | 150 | 150 |
| | Content (%/whole main fiber) | 59 | 59 |
| Synthetic fiber | Kind of fiber | Polypropylene fiber | Polyvinyl alcohol fiber |
| | Denier (dr) | 1.0 | 0.3 |
| | Content (%/whole main fiber) | 41 | 26 |
| Other fiber | Kind of fiber | — | Cotton linter |
| | Content (%/whole main fiber) | — | 15 |
| Content of polyvinyl alcohol binder fiber (%/Separator) | | 15 | 15 |
| Dissolution state of polyvinyl alcohol binder fiber | | Remaining fiber state | Remaining fiber state |
| Measured value | | | |
| Electrolytic solution absorption amount (g/g) | | 5.7 | 8.5 |
| Swelling degree (%) | | 26 | 32 |
| Dicharge time | 10 Ω continuous discharge (min) | 994 | 1007 |
| | 10 Ω 1 hour-a-day discharge (hour) | 14.1 | 16.2 |
| Evaluation | | | |
| Electrolytic solution absorptivity | | Δ | ⊙ |
| Swelling degree | | ○ | Δ |
| Short preventablility (Continuous discharge life) | | Δ | Δ |
| Large current dischargeability (Intermittent discharge life) | | Δ | ○ |
| Overall evaluation | | Δ | Δ |

TABLE 5

| | | Comparative Example 1 | Comparative Example 2 | Comparative Example 3 | Comparative Example 4 |
|---|---|---|---|---|---|
| Constitution of separator | | | | | |
| Fibrilated product of cellulose fiber | Kind of fiber | Mercerized cotton linter | Viscose rayon | Polynosic rayon | — |
| | Single fiber denier before beating (dr) | — | 1.5 | 0.5 | — |
| | Wet Young's modulus (g/d) | — | 6 | 18 | — |
| | Orientation degree Δn (×10$^{-3}$) | 30 or less | 19 | 39 | — |
| | Fibril diameter after beating (μ) | — | 3 | 0.5 | — |
| | CSF (ml) | 150 | 720 | 150 | — |
| | Content (%/whole main fiber) | 59 | 59 | 59 | — |
| Synthetic fiber | Kind of fiber | Polyvinyl alcohol fiber | Polyvinyl alcohol fiber | Polyvinyl alcohol fiber | Polyvinyl alcohol fiber |
| | Denier (dr) | 0.3 | 0.3 | 0.3 | 0.3 |
| | Content (%/whole main fiber) | 41 | 41 | 41 | 100 |
| Other fiber | Kind of fiber | — | — | — | — |
| | Content (%/whole main fiber) | — | — | — | — |
| Content of polyvinyl alcohol binder fiber (%/Separator) | | 15 | 15 | 15 | 15 |
| Dissolution state of polyvinyl alcohol binder fiber | | Remaining fiber state | Remaining fiber state | Remaining fiber state | Remaining fiber state |
| Measured value | | | | | |
| Electrolytic solution absorption amount (g/g) | | 6.8 | 6.6 | 7.4 | 4.0 |
| Swelling degree (%) | | 46 | 44 | 31 | 18 |
| Dicharge time | 10 Ω continuous discharge (min) | 997 | 872 | 1005 | 855 |
| | 10 Ω 1 hour-a-day discharge (hour) | 12.9 | 12.3 | 15.0 | 10.8 |

TABLE 5-continued

|  | Comparative Example 1 | Comparative Example 2 | Comparative Example 3 | Comparative Example 4 |
|---|---|---|---|---|
| Evaluation |  |  |  |  |
| Electrolytic solution absorptivity | ◯ | ◯ | ◯ | X |
| Swelling degree | X | X | Δ | ⊚ |
| Short preventablility (Continuous discharge life) | Δ | X | Δ | X |
| Large current dischargeability (Intermittent discharge life) | X | X | Δ | X |
| Overall evaluation | X | X | Δ | X |

We claim:

1. A separator for alkaline batteries containing a fibrillated product of a cellulose fiber, having a wet Young's modulus of 20 g/d or more and an orientation degree $\Delta n$ of $42 \times 10^{-3}$ or more, obtained by solvent-spinning a solution of cellulose.

2. The separator for alkaline batteries according to claim 1, further containing 5 wt. % or more of a synthetic fiber of 1 denier or less, based on the sum of the fibrillated product and the synthetic fiber.

3. The separator for alkaline batteries according to claim 1 wherein the cellulose fiber is solvent-spun cellulose fiber obtained by dry-jet wet spinning in water a spinning solution obtained by dissolving cellulose in an amine oxide to deposit cellulose.

4. The separator for alkaline batteries according to claim 1 wherein the crystallinity of the cellulose fiber is 50% or more.

5. The separator for alkaline batteries according to claim 1 wherein the beating degree (CSF value) of the fibrilated product is 700 to 25 ml.

6. The separator for alkaline batteries according to claim 1 wherein the single fiber denier before the fibrilation of the cellulose fiber is 0.4 to 3.0 deniers.

7. The separator for alkaline batteries according to claim 2 wherein the synthetic fiber is a polyvinyl alcohol fiber.

8. A separator for alkaline batteries comprising a fibrillated product of a cellulose fiber having a wet Young's modulus of 20 g/d or more and an orientation degree $\Delta n$ of $42 \times 10^{-3}$ or more, and a polyvinyl alcohol fiber of 1 denier or less, wherein the weight ratio of the fibrillated product to the polyvinyl alcohol fiber is 95:5 to 25:75, and further a polyvinyl alcohol binder wherein the weight ratio of the binder to the sum of the fibrillated product and the polyvinyl alcohol fiber is 3:97 to 30:70.

9. The separator for alkaline batteries according to claim 8 wherein a fibrous binder is used as the binder.

10. An alkaline battery in which a separator according to any one of claims 1-9 is used.

* * * * *